United States Patent [19]
Pruett et al.

[11] Patent Number: 5,010,165
[45] Date of Patent: Apr. 23, 1991

[54] DIMENSIONALLY STABLE POLYESTER MELT BLOWN WEB

[75] Inventors: Wayne P. Pruett; Max F. Meyer, Jr.; Kenneth E. Breeding, all of Kingsport, Tenn.

[73] Assignee: Eastman Kodak Company, Rochester, N.Y.

[21] Appl. No.: 360,806

[22] Filed: Jun. 2, 1989

[51] Int. Cl.$^5$ .............................................. C08G 63/02
[52] U.S. Cl. .................... 528/272; 528/308.2; 528/493; 528/494; 528/495; 528/502; 528/503; 428/36.1; 428/113; 428/287
[58] Field of Search ............... 528/272, 308.2, 493, 528/494, 495, 502, 503; 428/36.1, 113, 287

[56] References Cited

U.S. PATENT DOCUMENTS 3,849,241 11/1974 Butin et al. ........................... 161/169
4,847,125 7/1989 Schwartz ............................ 428/34.9

OTHER PUBLICATIONS

*Chemical Reviews*, 1975, vol. 75, No. 6, p. 744, "Solubility Parameters".
*Polymer Handbook*, 2nd Edition, Edited by J. Brandrup and E. H. Immergut, John Wiley & Sons, Section, pp. 337 through 359.

Primary Examiner—John Kight, III
Assistant Examiner—Sam A. Acquah
Attorney, Agent, or Firm—John F. Stevens; William P. Heath, Jr.

[57] ABSTRACT

A dimensionally stable polyester melt blown web composition is disclosed. The polyester melt blown web is obtained by contacting the web with a solvent, and drying the web. The solvents which are used have total solubility parameters ($S_o$) of 8.5 to 12.0 $(cal/cm^3)^{\frac{1}{2}}$, solubility parameter component due to hydrogen bonding ($S_h$) of 0.5 to 5.5 $(cal/cm^3)^{\frac{1}{2}}$ and solubility parameter component due to polar forces ($S_p$) of 0.5 to 7.0 $(cal/cm^3)^{\frac{1}{2}}$. The polyesters used for such melt blown webs include poly(ethylene-terephthalate), poly(cyclohexylene dimethylene terephthalate) and blends and copolymers of these polymers.

20 Claims, 10 Drawing Sheets

DIMENSIONALLY STABLE POLYESTER MELT BLOWN WEB

BACKGROUND OF THE INVENTION

1. Field of the Invention

The invention relates to melt blown webs or fabrics and more specifically to thermally stable, shrink-resistant polyester melt blown webs or fabrics.

2. Discussion of the Background

The market for melt blown fabrics is growing in the United States and Europe due to the versatility of these fabrics. Melt blowing is a means for converting a polymer directly into a nonwoven fabric. Currently polyolefin polymers and especially polypropylenes are primarily used as materials for melt blown fabrics. However, the demand is apparent for higher temperature, higher strength properties that cannot be met with polyolefin resins.

Polyester polymers would be a natural choice of material for melt blown fabrics due to their high level of acceptance and excellent performance in textile and nonwoven end uses. However, polyester melt blown webs currently available have the disadvantage of excessive shrinkage when the fabric is exposed to elevated temperatures. For example, during ironing, a poly(ethylene terephthalate) polyester fabric would be exposed to temperatures above the glass transition temperature of the polyester causing it to shrink.

There is thus a need for a dimensionally stable (i.e. shrink resistant) polyester melt blown web or fabric material.

SUMMARY OF THE INVENTION

Accordingly, it is an object of the invention to provide a polyester melt blown web or fabric which is dimensionally stable when exposed to elevated temperatures.

It is a further object of the invention to provide a dimensionally stable polyester melt blown web or fabric which possesses good surface characteristics.

It is another object of the invention to provide a process of fabricating dimensionally stable melt blown polyester.

The inventors have now discovered such a polyester melt blown web or fabric which satisfies these and other objects of the invention which will be apparent from the description of the invention given hereinbelow. The inventors have found that a class of polyester fabrics, when treated with solvents which have certain solubility parameter ranges and which are liquids over a convenient range, exhibit excellent dimensional stability even after exposure to elevated temperatures. These are polyester fabrics which have at least one polyester having an I.V. of about 0.4 to about 1.0 and comprising repeat units from (a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms, and (b) at least one glycol selected from aliphatic glycols having 2 to 10 carbon atoms and cycloaliphatic glycols having 6 to 10 carbon atoms.

BRIEF DESCRIPTION OF THE FIGURES

A more complex appreciation of the invention and many of its attendant advantages will be readily obtained as the same becomes better understood by reference to the following detailed description when considered in connection with the accompanying figures, wherein.

DETAILED DESCRIPTION OF THE PREFERRED EMBODIMENTS

Figure 1:
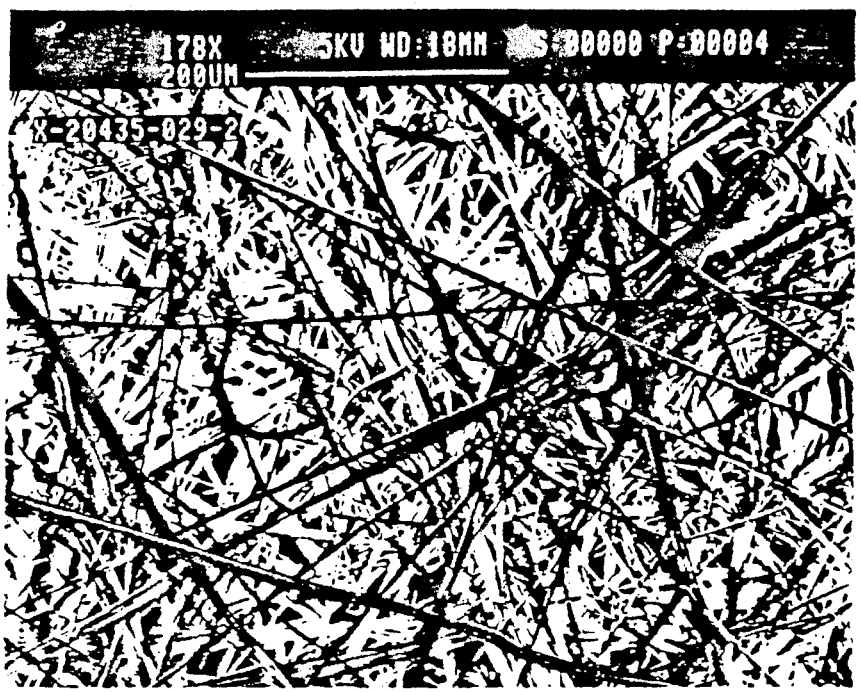
FIG. 1 is a scanning electron microscope photomicrograph of a polyethylene terephthalate melt blown web which has not been treated in accordance with the present invention.

Standard known procedures are used to produce the melt blown web polymer, e.g., the process disclosed in U.S. Pat. No. 3,849,241. Pellets are melted in an extruder and fed to a melt blowing die. The filaments emerging from the die orifices are rapidly attenuated to ultrafine diameters by hot, high velocity air. Melt blowing produces finer filaments than by any other currently known process.

A fabric is formed by a combination of the filaments interlacing and by thermal bonding as the attenuated ends are blown onto a conveyor or cylindrical screen. The process variables of extruder zone temperature and melt temperature, screw design, screw revolutions per minute (which corresponds to throughput), air temperature, air flow rate, die temperature, die to collector distance, and collector speed are all known to contribute to the characteristics of the end melt blown fabric produced.

The polyester melt blown web composition of the present invention comprises at least one polyester having an I.V. of about 0.4 to about .1.0 and comprising repeat units from a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms, and b) at least one glycol selected from aliphatic glycols having 2 to 10 carbon atoms and cycloaliphatic glycols having 6 to 10 carbon atoms.

The $C_{2-10}$ aliphatic glycols may be linear or branched. Examples include ethylene glycol, 1,3-propane diol, 1,4-butane diol, 1,5-pentane diol, 1,6-hexane diol, 1,7-heptane diol, 1,8-octane diol, 1,9-nonane diol, 1,10-decane diol or any branched variations of these glycols. The $C_{5-10}$ cycloaliphatic glycols include 1,2- or 1,3-cyclopentanediol, 1,2-, 1,3- or 1,4-cyclohexanediol, or similar $C_{7-10}$ aliphatic glycols.

Suitable aromatic dicarboxylic acids include, for example, terephthalic, isophthalic, etc. Suitable cycloaliphatic dicarboxylic acids include 1,4-cyclohexanedicarboxylic, etc. Suitable aliphatic dicarboxylic acids include succinic, glutaric, adipic, azelaic, sebacic, fumaric, maleic, itaconic, etc.

The polyester melt blown web composition of the present invention may thus contain either one polyester component or two or more of these polyester components in any convenient ratio.

In one preferred embodiment the polyesters which are used in this invention are poly(ethyleneterephthalate) (PET), poly(cyclohexylenedimethyleneterephthalate) (PCT) or copolymers or blends of these polymers.

The PET polyesters utilized in this invention are essentially homopolymers made from the reaction of ethylene glycol and dimethylterephthalate or terephthalic acid. Also copolymers of polyethyleneterephthalate useful in this invention are those copolyesters that are crystallizable and that contain other aromatic dibasic acids such as isophthalic acid, branched and linear aliphatic dibasic acids containing 3 to 20 carbon atoms, cycloaliphatic dibasic acids and branched and linear aliphatic glycols each containing 3 to 10 carbon atoms.

The PCT polyester is a homopolymer made from the reaction of cyclohexanedimethanol and dimethylterephthalate or terephthalic acid. Copolyesters of PCT that may be practiced in this invention are those copolymers that are crystallizable and can contain the same acids and glycols as those mentioned for the copolyesters of polyethyleneterephthalate.

Blends of PET- and PCT-type polymers are useful in all proportions so long as the blend is not held in the melt phase for a sufficient length of time to allow compositional equilibration which can produce amorphous polymers. Thus blends of PET- and PCT-type polymers containing each of these polymers in an amount of from 5 to 95 wt % can be used.

The peak melting temperatures as determined by DSC analysis range from 250° to 295° C. with heats of fusion from 7 to 10 cal/g. For those polyesters melting at 250° to 265° C. the melt viscosities range from 100 to 3650 poise, at 280° C. (100 sec$^{-1}$ shear rate). The PCT polymer, which melts at 295° C., has a melt viscosity of 1400 poise (100 sec$^{-1}$) at 310° C. Although these polyesters have melting points at 250° C. and above, they will exhibit excessive shrinkage at temperatures as low as 100° C. Post treating the melt blown web with a selected solvent will significantly reduce or eliminate this shrinkage up to the melting temperature of the polymer.

Melt-blown fabrics made from PET, PCT and copolyesters or blends as described above are relatively new developments which offer significant advantages and potential in applications including medical-surgical, filtration, insulation, protective clothing, clean room garments, personal hygiene and incontinent products, geotextiles, industrial wipes, tenting fabrics, and many other durable and disposable composites. These polyester melt blown fabrics have a unique combination of high strength, elongation, toughness, grab strength, and tear strength compared to either a 35 or 300 MFR polypropylene fabric. These attributes may be needed in some applications such as filter products, medical-surgical, and insulated fabrics.

Melt blown fabrics are effective filter materials because very small filament diameters are possible and the average filament size and pore dimensions can be systematically varied. Polyesters by nature have very narrow molecular weight distributions compared to polypropylene. This is an advantage in melt blowing and may partially account for the relatively narrow range of filament diameters that have been obtained. Improved strength and toughness, as well as the fine filament diameters and the good solvent resistance obtainable with polyesters provide the critical properties required for air and liquid filtration. However, the untreated melt blown web made in the form of filters, for example, undergo excessive shrinkage if exposed to elevated temperatures during the filtration process leading to changes in the filtration properties. The solvent treating step described in this work eliminates this problem.

For many medical-related applications, sterilization is required. Gamma radiation sterilization is an effective method and its usage is increasing. Polyesters offer very good gamma radiation resistance compared to polypropylene which shows losses in strength. Further, polypropylene develops objectional odors in sealed packs after gamma sterilization where polyesters do not. Sterilization of polyesters using steam normally cannot be carried out on melt blown web as produced. However, after solvent treating, these melt blown webs can undergo steam sterilization as well as gamma sterilization.

The very small diameter filaments ($\leq$ 1 micron) obtainable in polyester melt blown webs gives these fabrics a very high insulating capacity compared to other types of nonwoven and woven fabrics. Polypropylene melt blown fabrics are currently being used as the insulation layer in apparel. However, polypropylene cannot withstand the temperatures involved in commercial laundering or in electric or gas dryers without unacceptable shrinkage. PET melts at 250° C. compared to about 166° C. for polypropylene but melt blown fabrics of PET that have not been crystallized will begin to shrink significantly at about 70° C. Thus, the stabilization of PET melt blown fabrics to temperatures as high as 200° C. or higher is a significant improvement which changes these fabrics from being unacceptable to being highly effective as insulating fabrics.

The polyester melt blown web compositions of the present invention are prepared by first melt blowing a polyester product to produce a web composition. This web composition is then treated with a solvent having a total solubility parameter from 8.5 to 12.0 $(cal/cm^3)^{\frac{1}{2}}$. The thus treated melt blown web composition is then dried. The treatment operation can be achieved by such techniques as submersion of the melt blown web composition in the solvent, spraying the solvent onto the composition, or exposing the web to vapors of the solvent. The duration of the treatment will depend on the mode of treatment selected, but to achieve the results provided by the present invention the polyester product should be exposed to the solvent long enough to wet the web, from, for example, 2 seconds or longer, up to any time, so long as the web does not start to dissolve.

The solvent used, in addition to possessing the total solubility parameter described above, preferably possesses a solubility parameter component due to hydrogen bonding of from 0.5 to 5.5 $(cal/cm^3)^{\frac{1}{2}}$, a solubility parameter component due to polar forces of 0.5 to 7.0 $(cal/cm^3)^{\frac{1}{2}}$, a melting point which is less than 0° C. and a boiling point which is less than or equal to 200° C.

Exemplary solvents which may be used in accordance with the present invention include methylisobutylketone, toluene, ortho-or meta-xylene, ethylacetate, methylethylketone, tetrahydrofuran, chlorobenzene, acetone, perchloroethylene or methylene chloride.

By treating the polyester melt blown web composition of the present invention in this manner, one obtains a polyester melt blown web composition product which, upon reaching temperatures up to its softening point, suffer no more than a shrinkage of 10% in any dimension. By contrast, prior art polyester melt blown web compositions suffered shrinkages of at least 40%, when heated up to its softening point, in any one direction under similar treatment.

Other features of this invention will become apparent in the course of the following descriptions of exemplary embodiments which are given for illustration of the invention and are not intended to be limiting thereof.

Figure 2:
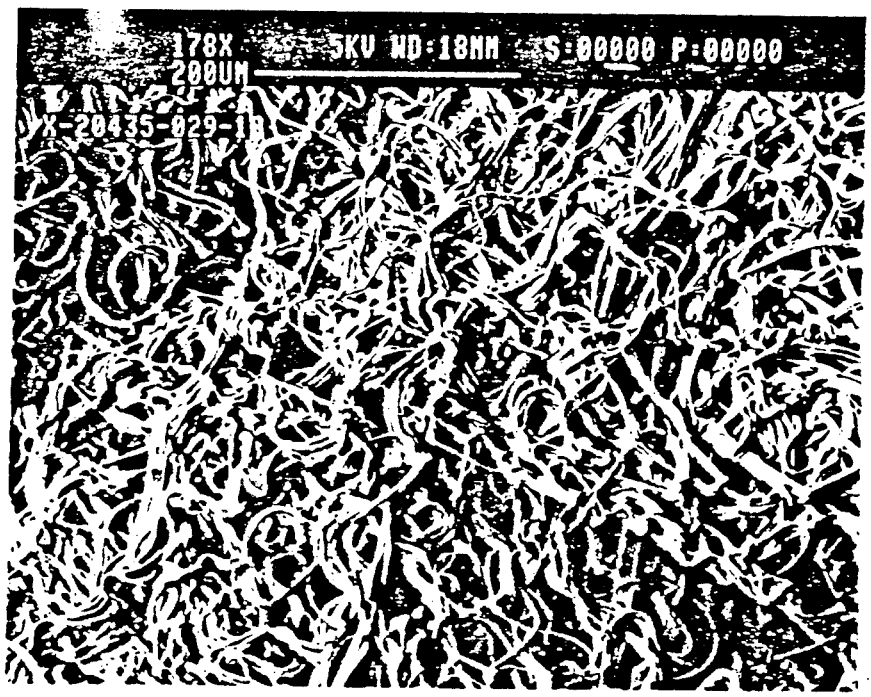
FIG. 2 is a scanning electron microscope photomicrograph of a polyethylene terephthalate melt blown web after 10 minutes at 200° C.

A poly(ethylene terephthalate) melt blown fabric was prepared at a melt temperature of 308° C. under the conditions described in Table 1 as Sample 1. The fabric weighed 24.3 g/m² and the average fiber diameter as determined by SEM photomicrographs was 2 to 7 microns. The web had a Tm of 251° C. and a Tch of 130° C. in a first cycle DSC thermal analysis. The untreated web was placed in an air oven at a temperature of 140° C. (Table 2). The web instantly started to shrink and when removed from the oven after approximately 10 minutes the sample had shrunk to 40% of its original size. This shows that a PET melt blown web is thermally unstable even at temperatures significantly below the melting point of the polymer but above its glass transition temperature (Tg=80° C.). Further the web had little or no crystallinity as shown by the Tch value of 130° C. on a first cycle DSC thermal analysis. SEM of photographs of the web before any treatment (FIG. 1) and after being heated at 200° C. for 10 minutes (FIG. 2) show the effect of heating and shrinking of the web.

Figure 3:
FIG. 3 is a scanning electron microscope photograph of a polyethylene terephthalate melt blown web treated with acetone.
Figure 4:
FIG. 4 is a scanning electron microscope photomicrograph of a polyethylene terephthalate melt blown web treated with acetone and exposed for 10 minutes to a temperature of 200° C.

By contrast, a PET melt blown web produced under the identical process parameters was solvent treated. The web was submerged in acetone for a contact time of 2 minutes. The web was allowed to air dry for 24 hours at 23° C. Effect of the acetone treatment and drying process on the web caused it to shrink initially 8.3% in both the longitudinal dimension (LD) and perpendicular cross dimension (CD) of the web (Table 2). As shown in Table 2, this web exhibited little or no shrinkage after exposures to temperatures of 115°, 150° and 200° C. or after exposure to boiling water. After the acetone treatment or any subsequent heating the web does not show a Tch on the first cycle DSC analysis, indicating that it is crystallized. SEM photomicrographs of the web after acetone treatment (FIG. 3) show that the acetone has only slightly roughened the fiber surface. FIG. 4 shows that the acetone treatment and exposure to 200° C. for 10 minutes has no apparent effect on the fiber surface. Similar good results are obtained with PET modified up to either 10 mol % cyclohexanedimethanol or 10 mol % isophthalic acid.

Figure 5:
FIG. 5 is a scanning electron microscope photomicrograph of a poly(cyclohexylenedimethyleneterephthalate) polyester melt blown web not treated in accordance with the present invention.
Figure 6:
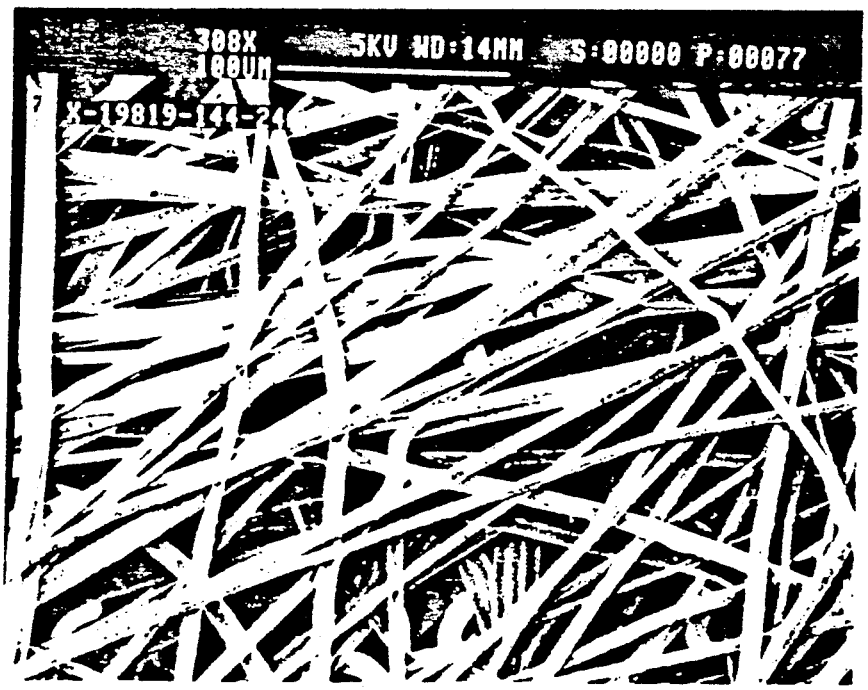
FIG. 6 is a scanning electron microscope photomicrograph of a poly(cyclohexylenedimethyleneterephthalate) polyester melt blown web treated with acetone.
Figure 7:
FIG. 7 is a scanning electron microscope photomicrograph of a poly(cyclohexylenedimethyleneterephthalate) polyester melt blown web treated with acetone and exposed for 10 minutes to a temperature of 200° C.

PCT was melt blown in a nonwoven fabric at a melt temperature of 306° C. under the conditions described in Table 1, Sample 2. The resulting fabric had a weight of 38.0 g/m² and the average fiber diameter as determined by SEM photomicrographs is 2.9 to 5.9 microns. The untreated web showed a crystallization peak on heating (Tch) on first cycle of 135° C. indicating that the web was not crystalline. As shown in Table 2 the untreated web was placed in an air oven for 5 minutes at 94° C. Shrinkage was 2.5% in the CD direction and 9.1% in the LD direction. After exposure to 121° C. for 5 minutes the web shrank 20.6% in the CD direction and 21.3% in the LD direction. After exposure to 149° C. for 5 minutes the web shrank an additional 16.9% in the CD direction and 30.3% in the LD direction. Another PCT web was produced by the same parameters (as those in Table 1) and was then placed in acetone for 2 minutes. The web was allowed to dry for 24 hours at 23° C. The acetone treated web initially shrank 5.2% in the LD direction and 4.2% in the CD direction. As shown in Table 2 the acetone treated web showed little or no shrinkage after exposure to temperatures of 115°, 150° and 200° C. and after exposure to boiling water. After the acetone treatment or any subsequent treatment this web did not show a crystallization peak on heating (Tch) on first cycle DSC analysis, indicating that it was crystallized. SEM micrographs of the untreated web (FIG. 5), after acetone treatment only (FIG. 6) and after acetone treatment and exposure to 200° C. for 10 minutes (FIG. 7) show that the acetone and heat treatment have little or no discernible effect on the surface of the fibers. Similarily good results are obtained with PCT modified with up to about 20 mol % isophthalic acid or modified with up to 20 mol % ethylene glycol.

A PET melt blown web as described in Table 1, Sample 1 was treated with 12 different solvents (arranged in accordance to ascending solubility parameter values) as listed in Table 3. These solvents were chosen to test various solvent types, e.g., aliphatic, cycloaliphatic, aromatic, protic, aprotic, etc., and are not intended to be limiting. A PET web sample was immersed in each solvent for 2 minutes. The web was allowed to air dry for 72 hours at 23° C. The degree of shrinkage of the web was determined in both the CD and LD directions. Each web was then placed in a forced air oven maintained at 200° C. for an exposure time of 10 minutes. After the webs were removed from the oven they were allowed to cool at room temperature for 24 hours and the additional shrinkage from the exposure in the 200° C. heat was measured. The results are listed in Table 3 for each sample. These results are also discussed as Examples 1-12 following.

The solubility parameter data given in Table 3 for each solvent includes $S_o$, the total solubility parameter; $S_d$, a component due to dispersion forces; $S_p$, the component due to polar forces; and $S_h$, the component due to hydrogen bonding. A general discussion concerning solubility parameters is given in *Polymer Handbook*, 2nd Edition, edited by J. Brandrup and E. H. Immergut, John Wiley & Sons, Section IV, pages 337 through 359. The three dimensional solubility parameter data $S_o$, $S_d$, $S_p$ and $S_h$ were abstracted from Table 3, Section IV, pages 348 through 349 except for the data on tetrachloroethylene and heptane which were obtained from *Chemical Reviews*, 1975, Vol. 75, No. 6, page 744, "Solubility Parameters" by Allan F. M. Boston. The units for solubility parameters are $(cal/cm^3)^{\frac{1}{2}}$.

EXAMPLES

EXAMPLE 1

Figure 8:
FIG. 8 is a scanning electron microscope photomicrograph of a polyethylene terephthalate polyester melt blown web treated with heptane and exposed for 10 minutes to a temperature of 200° C.

Immersion of the PET web in heptane [$S_o=7.48$] gives zero shrinkage but the web exhibits 64.6% shrinkage CD and 62.5% shrinkage LD after heat treatment. SEM photomicrograph of the web after both solvent and heat treatment shows no apparent change in the fibers of the web (FIG. 8).

EXAMPLE 2

Figure 9:
FIG. 9 is a scanning electron microscope photomicrograph of a polyethylene terephthalate polyester melt blown web treated with MIBK and exposed for 10 minutes to a temperature of 200° C.

Immersion of the PET web in methyl isobutyl ketone (MIBK) [$S_o=8.57$] gives 2.1% shrinkage both CD and LD and only 3.1% shrinkage in both CD and LD after heat treatment. SEM photomicrograph of the web after both solvent and heat treatment shows no apparent change in the fibers of the web (FIG. 9).

EXAMPLE 3

Figure 10:
FIG. 10 is a scanning electron microscope photomicrograph of a polyethylene terephthalate polyester melt blown web treated with toluene and exposed for 10 minutes to a temperature of 200° C.

Immersion of the PET web in toluene [$S_o=8.91$] gives 6.3% shrinkage CD and 7.3% LD but no shrinkage in CD and LD after heat treatment. SEM photomicrograph of the web after both solvent and heat treatment shows no apparent change in the fibers of the web (FIG. 10).

EXAMPLE 4

Figure 11:
FIG. 11 is a scanning electron microscope photomicrograph of a polyethylene terephthalate polyester melt blown web treated with ethyl acetate and exposed for 10 minutes to a temperature of 200° C.

Immersion of the PET web in ethyl acetate [$S_o=9.10$] gives 11.5% shrinkage CD and 10.4% LD but no shrinkage in CD and LD after heat treatment. SEM photomicrograph of the web after both solvent and heat treatment shows a very slight roughening of the surface of the fibers (FIG. 11).

EXAMPLE 5

Figure 12:
FIG. 12 is a scanning electron microscope photomicrograph of a polyethylene terephthalate polyester melt blown web treated with MEK and exposed for 10 minutes to a temperature of 200° C.

Immersion of the PET web in methyl ethyl ketone (MEK) [$S_o=9.27$] gives 11.5% shrinkage CD shrinkage and 10.4% LD but no shrinkage in CD and LD after heat treatment. SEM photomicrograph of the web after both solvent and heat treatment shows no apparent change in the fibers of the web (FIG. 12).

EXAMPLE 6

Figure 13:
FIG. 13 is a scanning electron microscope photomicrograph of a polyethylene terephthalate polyester melt blown web treated with THF and exposed for 10 minutes to a temperature of 200° C.

Immersion of the PET web in tetrahydrofuran (THF) [$S_o=9.52$] gives 20.8% shrinkage CD and 18.8% LD but no shrinkage in CD and LD after heat treatment. SEM photomicrograph of the web after both solvent and heat treatment shows significant solubilization of the web (FIG. 13).

EXAMPLE 7

Figure 14:
FIG. 14 is a scanning electron microscope photomicrograph of a polyethylene terephthalate polyester melt blown web treated with chlorobenzene and exposed for 10 minutes to a temperature of 200° C.

Immersion of the PET web in chlorobenzene [$S_o=9.57$] gives a 9.4% shrinkage CD and 10.4% LD but only 1.0% shrinkage in both CD and LD after heat treatment. SEM photomicrograph of the web after both solvent and heat treatment shows a significant degree of roughening of the surface of the fibers from the solvent treatment (FIG. 14).

EXAMPLE 8

Figure 15:
FIG. 15 is a scanning electron microscope photomicrograph of a polyethylene terephthalate polyester melt blown web treated with acetone and exposed for 10 minutes to a temperature of 200° C.

Immersion of the PET web in acetone [$S_o=9.77$] gives 18.8% shrinkage CD and 17.7% LD but no shrinkage in CD and LD after heat treatment. SEM photomicrograph of the web after both solvent and heat treatment shows a slight roughening of the surface of the fibers from the solvent treatment (FIG. 15).

EXAMPLE 9

Figure 16:
FIG. 16 is a scanning electron microscope photomicrograph of a polyethylene terephthalate polyester melt blown web treated with tetrachloroethylene (perchloroethylene) and exposed for 10 minutes to a temperature of 200° C.

Immersion of the PET web in tetrachloroethylene (perchloroethylene) [$S_o=9.92$] gives 3.1% shrinkage CD and 1.0% LD and 32.3% shrinkage CD and 36.5% LD after heat treatment. SEM photomicrograph of the web after both solvent and heat treatment shows no apparent change in the fibers of the web (FIG. 16).

EXAMPLE 10

Figure 17:
FIG. 17 is a scanning electron microscope photomicrograph of a polyethylene terephthalate polyester melt blown web treated with methylene chloride and exposed for 10 minutes to a temperature of 200° C.

Immersion of the PET web in methylene chloride [$S_o=9.93$] gives 66.7% shrinkage CD and 54.2% LD but no shrinkage after heat treatment. SEM photomicrograph of the web after both solvent and heat treatment shows that the web is being dissolved by the solvent (FIG. 17).

EXAMPLE 11

Figure 18:
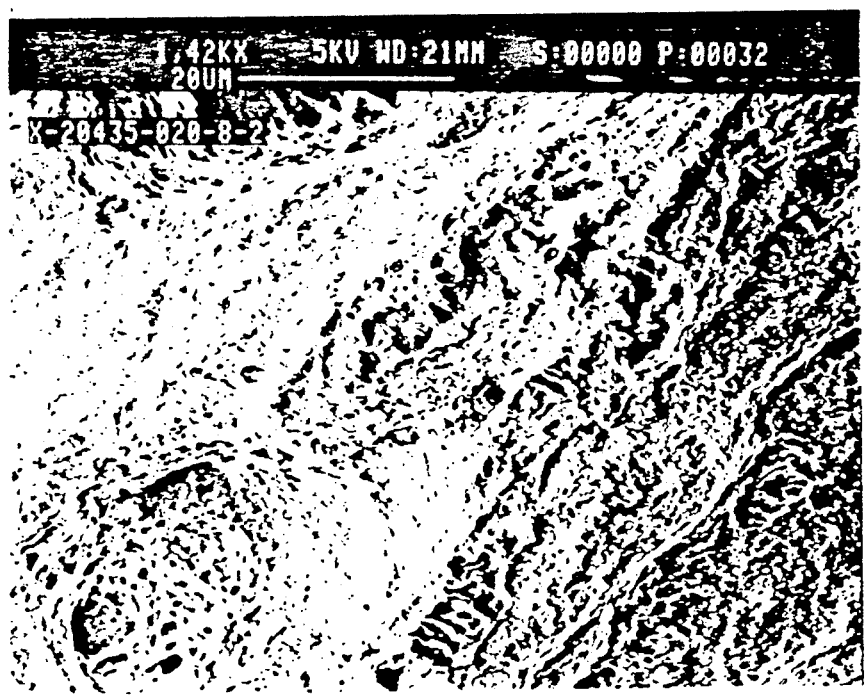
FIG. 18 is a scanning electron microscope photomicrograph of a polyethylene terephthalate polyester melt blown web treated with DMF and exposed for 10 minutes to a temperature of 200° C.

Immersion of the PET web in dimethylformamide (DMF) [$S_o=12.14$] gives 20.8% shrinkage CD and 29.2% LD but no shrinkage after heat treatment. SEM photomicrograph of the web after both solvent and heat treatment shows significant attack of the web by the solvent (FIG. 18).

EXAMPLE 12

Figure 19:
FIG. 19 is a scanning electron microscope photomicrograph of a polyethylene terephthalate polyester melt blown web treated with methyl alcohol and exposed for 10 minutes to a temperature of 200° C.

Immersion of the PET web in methyl alcohol [$S_o=14.28$] gives 1.0% shrinkage in both CD and LD but 69.8% shrinkage in both CD and LD after heat treatment. SEM photomicrograph of the web after both solvent and heat treatment shows that the solvent has no apparent effect on the web (FIG. 19).

From the solvents tested it was discovered that polyester melt blown webs can be crystallized and/or stabilized without significant degrees of shrinkage during the solvent treatment step or during the heat treatment step if they possess the following properties:

(1) $S_o = 8.5-12.0$ (total solubility parameter),
(2) $S_h = 0.5-5.5$ (component due to hydrogen bonding), and
(3) $S_p = 0.5-7.0$ (component due to polar forces).

Further, such solvents should be liquids over a useful range, i.e., have a melting point less than 0° C. Also these solvents should exhibit good volitility, i.e., have a boiling point $\leq 200°$ C.

The solubility parameter relationship just identified is not negated by perchloroethylene's performance (Example 9). Where a relatively large molecule solvent is chosen (e.g., a molecule possessing more than one halogen atom) the duration of solvent exposure and temperature of the solvent should be adjusted. The effects of elevated temperature and increased duration of the solvent treatment on a PET melt blown web are shown by the following experiment.

A PET melt blown web was again made according to the process parameters of Table 1, Sample 1. Samples of this web were exposed to perchloroethylene for 2 minutes or 10 minutes at room temperature or 60° C., respectively. The results are shown in Table 4. The web sample exposed to perchloroethylene for 10 minutes at 60° C. exhibited shrinkage more in line with the solvents of Table 3 possessing comparable solubility parameter characteristics. An important limitation on the solvent temperature is that it be appreciably below the Tg of the polyester. Otherwise undesirable web shrinkage could occur.

It should be understood that the solvent treatment and thermal testing conditions of Table 3 were chosen only to test the solvent affect and are not limitative. The only limitations on a polyester melt blown web solvent treatment is that the web be thoroughly wetted by the solvent, at a temperature below the glass transition temperature (Tg) of that polyester, and that the web is dry prior to exposure to elevated temperatures. Accordingly, the web may be sprayed with a solvent or exposed to solvent vapors (if the vapor temperature is sufficiently low compared to the Tg of the polyester). Web drying ought to occur near room temperature; heating of a web, wet with solvent, could cause polymer degradation. However, once dry the web may be heated, without degradation or substantial shrinkage, up to a temperature where that polyester begins to softer (somewhat less than $T_m$). The length of time that a polyester melt blown web may be heated is only limited by oxidation of the polymer. In other words a polyester melt blown web could withstand heat for quite some time in a nonoxidating atmosphere.

TABLE 1

| Reference | PET Sample 1 | PCT Sample 2 |
|---|---|---|
| Temperature °F. (°C.) | | |
| Extruder | 560 (293) | 589 (310) |
| Melt | 587 (308) | 582 (306) |
| Air | 568–621 (298–327) | 661 (349) |
| Die | 570–580 (299–304) | 591–602 (311–317) |
| Die to Collector Distance (in.) | 14 | 6 |
| Web Weight (g/m²) | 24.3 | 38.0 |
| Fiber Diameter (microns) | 2.0–7.0 | 2.9–5.9 |

TABLE 2

Shrinkage of Various Polyester Melt Blown Webs After Specific Treatments

| | | | Percent Shrinkage | |
|---|---|---|---|---|
| Treatment | | | PET Sample 1 | PCT Sample 2 |
| Web Heated @ | 94° C. | CD | | 2.5 |
| | | LD | | 9.1 |
| | 121° C. | CD | | 20.6 |
| | | LD | | 21.3 |
| | 140° C. | CD | 60 | |
| | | LD | 60 | |
| | 149° C. | CD | | 16.9 |
| | | LD | | 30.3 |
| Acetone Treated Web | | CD | 8.3 | 5.2 |
| | | LD | 8.3 | 4.2 |
| Acetone Treated & 115° C. (10 min) | | CD | 0.6 | 0 |
| | | LD | 0.6 | 0.5 |
| Acetone Treated & 150° C. (10 min) | | CD | 0 | 1.1 |
| | | LD | 0 | 0 |
| Acetone Treated & 200° C. (10 min) | | CD | 0 | 1.7 |
| | | LD | 0 | 0 |
| Acetone Treated Web + Boiling Water | | CD | 1.7 | 1.1 |
| | | LD | 1.7 | 0.6 |
| Acetone Treated & 150° C. (10 min) + Boiling Water | | CD | 0 | 0.6 |
| | | LD | 2.2 | 0.6 |
| Acetone Treated & 150° C. (10 min) + Boiling Water | | CD | 1.1 | 1.6 |
| | | LD | 1.1 | 1.1 |
| Acetone Treated & 200° C. (10 min) + Boiling Water | | CD | 0 | 2.2 |
| | | LD | 0 | 1.1 |

LD = Longitudinal dimension, CD = Cross dimension

TABLE 3

Solubility Parameters of Solvents and Their Effect on PET Melt Blown Web

| | Solubility Parameter $[cal/cm^3]^{\frac{1}{2}}$ | | | | Web Shrinkage | | | |
|---|---|---|---|---|---|---|---|---|
| | | | | | Solvent | | Heat | |
| Solvent | $S_o$ | $S_d$ | $S_p$ | $S_h$ | LD | CD | LD | CD |
| 1 Heptane | 7.48 | 7.48 | 0.0 | 0.0 | 0.0 | 0.0 | 62.5 | 64.6 |
| 2 MIBK | 8.57 | 7.49 | 3.0 | 2.0 | 2.1 | 2.1 | 3.1 | 3.1 |
| 3 Toluene | 8.91 | 8.82 | 0.7 | 1.0 | 7.3 | 6.3 | 0.0 | 0.0 |
| 4 Ethyl Acetate | 9.10 | 7.44 | 2.6 | 4.5 | 10.4 | 11.5 | 0.0 | 0.0 |
| 5 MEK | 9.27 | 7.77 | 4.4 | 2.5 | 10.4 | 11.5 | 0.0 | 0.0 |
| 6 THF | 9.52 | 8.22 | 2.8 | 3.9 | 18.8 | 20.8 | 0.0 | 0.0 |
| 7 Chlorobenzene | 9.57 | 9.28 | 2.1 | 1.0 | 10.4 | 9.4 | 1.0 | 1.0 |
| 8 Acetone | 9.77 | 7.58 | 5.1 | 3.4 | 17.7 | 18.8 | 0.0 | 0.0 |
| 9 Perchloroethylene | 9.92 | 9.29 | 3.2 | 1.4 | 1.0 | 3.1 | 36.5 | 32.3 |
| 10 Methylene Chloride | 9.93 | 8.91 | 3.1 | 3.0 | 54.2 | 66.7 | 0.0 | 0.0 |
| 11 DMF | 12.14 | 8.52 | 6.7 | 5.5 | 29.2 | 20.8 | 0.0 | 0.0 |
| 12 Methanol | 14.28 | 7.42 | 6.0 | 10.9 | 1.0 | 1.0 | 69.8 | 69.8 |

$S_o$ = Total solubility parameter
$S_d$ = Component due to dispersion forces
$S_p$ = Component due to polar forces
$S_h$ = Component due to hydrogen bonding

TABLE 4

Perchloroethylene Treatment of PET Melt Blown Web for Different Temperatures and Durations and Shrinkage Effect

| Temperature | Time in Perchloroethylene | Web Shrinkage | | | |
|---|---|---|---|---|---|
| | | Solvent | | Heat | |
| | | CD | LD | CD | LD |
| 23° C. | 2 min | 0 | 0 | 43.8% | 46.9% |
| 23° C. | 10 min | 0 | 0 | 36.5 | 36.5 |
| 60° C. | 2 min | 4.2 | 4.2 | 6.2 | 7.3 |
| 60° C. | 10 min | 4.2 | 4.2 | 7.3 | 7.3 |

As used herein, the inherent viscosity (I.V.) is measured at 25° C. using 0.50 g of polymer per 100 mL of a solvent consisting of 60% by weight phenol and 40% by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

Obviously, numerous modifications and variations of the present invention are possible in light of the above teaching. It is therefore to be understood that within the scope of the appended claims, the invention may be practiced otherwise than an specifically described herein.

We claim:

1. A non-heat shrunk polyester melt blown web composition, comprising:
   at least one polyester having an I.V. of about 0.4 to about 1.0 and comprising repeat units from
   (a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms,
   (b) at least one glycol selected from aliphatic glycols having 2 to 10 carbon atoms and cycloaliphatic glycols having 6 to 10 carbon atoms, and
   (c) wherein said web composition shrinks no more than 10% in both its longitudinal and cross dimensions upon exposure to a temperature up to its melting temperature.

2. The polyester melt blown web composition of claim 1, wherein the diol component is at least one member selected from the group consisting of ethylene glycol, 1,3-cyclohexanedimethanol and 1,4-cyclohexanedimethanol.

3. The polyester melt blown web composition of claim 1, wherein the diacid component is terephthalic acid.

4. The polyester melt blown web composition of claim 1, wherein the diol component is ethylene glycol and the diacid component is terephthalic acid.

5. The polyester melt blown web composition of claim 1 wherein the diol component is 1,4-cyclohexanediemethanol and the diacid component is terephthalic acid.

6. The polyester melt blown web composition of claim 1, wherein the diol component is ethylene glycol.

7. A polyester melt blown web composition prepared by a process comprising:
   melt blowing at least one polyester having an I.V. of about 0.4 to about 1.0 and comprising repeat units from
   (a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms, and
   (b) at least one glycol selected from aliphatic glycols having 2 to 10 carbon atoms and cycloaliphatic glycols having 6 to 10 carbon atoms,
   treating the melt blown web composition with a solvent where the solvent has a total solubility parameter of 8.5 to 12.0 $(cal/cm^3)^{\frac{1}{2}}$, and drying the melt blown web composition.

8. The polyester melt blown web of claim 7, comprising using as the solvent, a solvent having a solubility parameter component due to hydrogen bonding of 0.5 to 5.5 $(cal/cm^3)^{\frac{1}{2}}$; a solubility parameter component due to polar forces of 0.5 to 7.0 $(cal/cm^3)^{\frac{1}{2}}$; a melting point less than 0° C. and a boiling point less than or equal to 200° C.

9. The polyester melt blown web composition of claim 7, comprising using as the solvent a solvent selected from the group consisting of methyl isobutyl ketone, toluene, ethyl acetate, methyl ethyl ketone, tetrahydrofuran, chlorobenzene, acetone, perchloroethylene, and methylene chloride.

10. The polyester melt blown web composition of claim 7, comprising using as the diol component at least one member selected from the group consisting of ethylene glycol, 1,3-cyclohexanedimethanol and 1,4-cyclohexanedimethanol.

11. The polyester melt blown web composition of claim 7, comprising using as the diacid component is terephthalic acid.

12. The polyester melt blown web composition of claim 7, comprising using as the diol component ethylene glycol and using as the diacid component terephthalic acid.

13. The polyester melt blown web composition of claim 7, comprising using as the diol component 1,4-cyclohexanedimethanol and using as the diacid component terephthalic acid.

14. The polyester melt blown web composition of claim 7, comprising using as the diol component ethylene glycol.

15. A process for obtaining a dimensionally stable polyester melt blown web composition, comprising: at least one polyester having an I.V. of about 0.4 to about 1.0 and comprising repeat units from
   (a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms, and
   (b) at least one glycol selected from aliphatic glycols having 2 to 10 carbon atoms and cycloaliphatic glycols having 6 to 10 carbon atoms, said process comprising
   treating the melt blown web composition with a solvent where the solvent has a total solubility parameter of 8.5 to 12.0 $(cal/cm^3)^{\frac{1}{2}}$, and drying the melt blown web composition.

16. The process of claim 15, wherein the treating of the melt blown web with the solvent comprises submersing.

17. The process of claim 15, wherein the treating of the melt blown web comprises spraying.

18. The process of claim 15, wherein the treating of the melt blown web comprises exposing the web to vapors of the solvent.

19. A polyester article made of a non-heat shrunk polyester melt blown web composition comprising at least one polyester having an I.V. of about 0.4 to about 1.0 and comprising repeat units from
  (a) at least one dibasic acid selected from terephthalic acid, isophthalic acid, aliphatic dicarboxylic acids having 3 to 20 carbon atoms, and cycloaliphatic dicarboxylic acids having 8 to 10 carbon atoms, and
  (b) at least one glycol selected from aliphatic glycols having 2 to 10 carbon atoms and cycloaliphatic glycols having 6 to 10 carbon atoms,
wherein said web composition shrinks no more than 10% in both its longitudinal and cross dimensions upon exposure to a temperature up to its melting temperature.

20. The article of claim 19, wherein said article is a medical-surgical article, a filtration article, an insulation article, a protective clothing article, a clean room garment, a personal hygiene and incontinence product, a geotextile article, an industrial wipe article, or a tenting fabric.

* * * * *

UNITED STATES PATENT AND TRADEMARK OFFICE
CERTIFICATE OF CORRECTION

PATENT NO. : 5,010,165

DATED : April 23, 1991

INVENTOR(S) : Wayne P. Pruett, Max F. Meyer, Jr., Kenneth E. Breeding

It is certified that error appears in the above-identified patent and that said Letters Patent is hereby corrected as shown below:

Column 11, line 33, Claim 1 "non-beat" should read ---non-heat---

Signed and Sealed this

Tenth Day of November, 1992

Attest:

DOUGLAS B. COMER

*Attesting Officer*    Acting Commissioner of Patents and Trademarks